Feb. 7, 1928.
J. R. OISHEI
WINDSHIELD WING
Filed Jan. 22, 1926
1,658,390
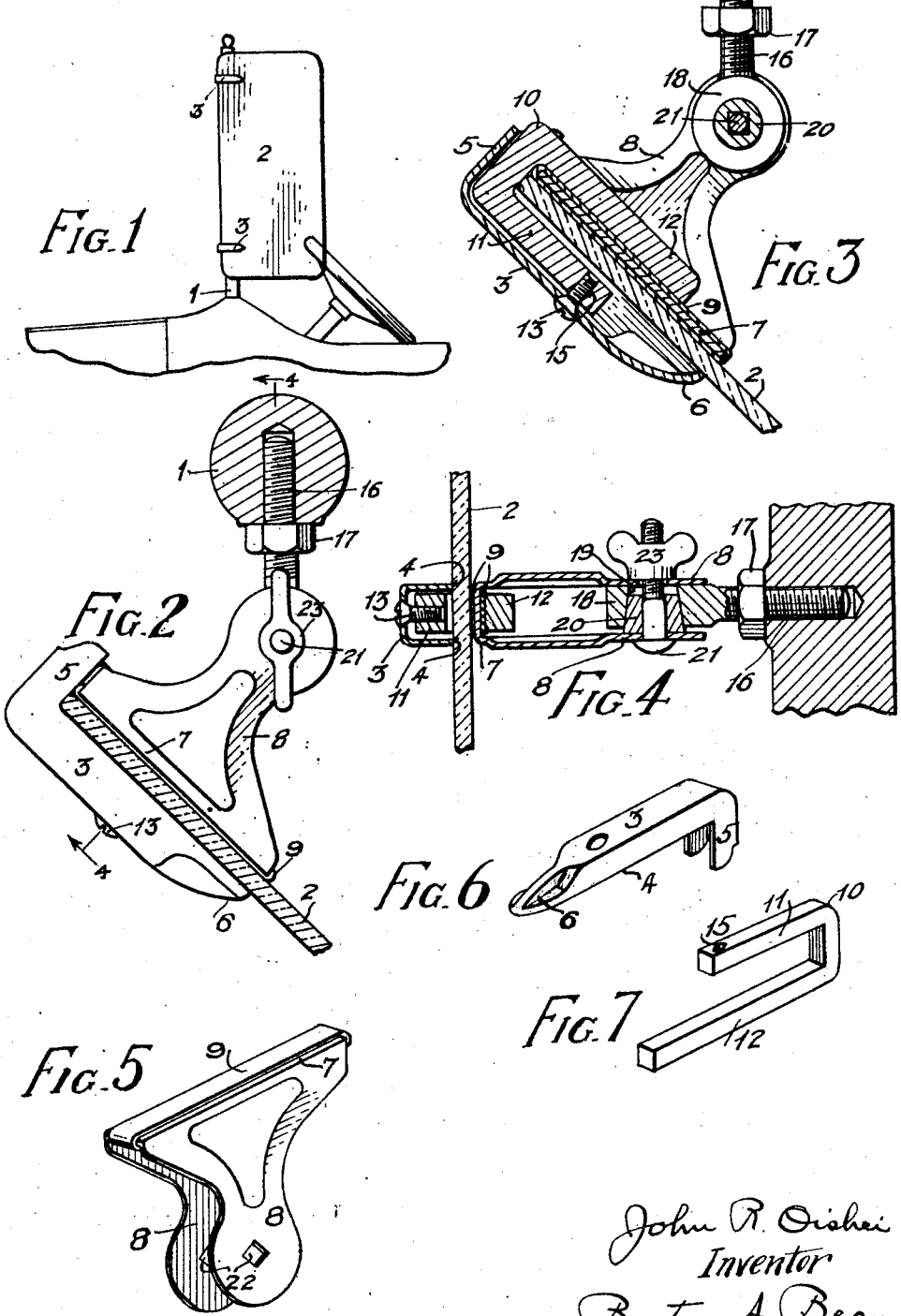
John R. Oishei
Inventor
by Barton A. Bean Jr.
Attorney Patented Feb. 7, 1928.

1,658,390

UNITED STATES PATENT OFFICE.

JOHN R. OISHEI, OF BUFFALO, NEW YORK, ASSIGNOR TO TRICO PRODUCTS CORPORATION, OF BUFFALO, NEW YORK.

WINDSHIELD WING.

Application filed January 22, 1926. Serial No. 82,922.

This invention relates to a glass holding clamp and has particular reference to a novel clamp for securing a wind deflecting wing to the side of a windshield of a motor vehicle.

Constructions have heretofore been devised for attaching transparent glass wings or panels to the opposite sides of the usual windshields of motor vehicles for deflecting wind currents away from the occupants of the vehicle. Such wing attaching devices or constructions classify themselves according to their mountings, a certain type requiring the formation of a recess or opening in the transparent panel to receive a securing or anchoring part of the attaching device. Another type embodies those devices which do not require any preformation of the wind deflecting panel and consists broadly of clamping members or jaws which are brought into a firm gripping relation to the opposite faces of the glass panel. The clamping members have heretofore been of heavy cast metal or cumbersome formation in order to obtain the desired clamping pressure requisite for supporting the glass panels, and, at the same time, breakage of the included glass must be guarded against through uneven pressure applications.

Among the objects of the present invention are first, the provision of an attaching device of the clamp type for firmly clamping and supporting a plate of glass without breakage or drilling the glass; second, the formation of the clamping members or jaws from sheet metal; third, the inclusion of a connector between the clamping members to reinforce the same and to transmit therebetween the pressure strains incidental to the mounting of a transparent panel; fourth, the mounting and relating of the several parts by which the clamping jaws assume an even engagement with the opposite faces of the transparent panel; and fifth, the provision of an improved adjustable bracket support for mounting the clamping jaws on a windshield and by which a desired adjustment of the supported wing may be definitely secured.

The invention further resides in the salient features of construction and the arrangements and combinations of parts hereinafter described and claimed, reference being made to the accompanying drawings wherein:

Fig. 1 is a fragmentary side elevation of a motor vehicle illustrating a pair of the improved clamps employed in the mounting of a side wing.

Fig. 2 is a top plan view of one of the clamps attached to a windshield standard, the latter, with the attached wing, being shown in section.

Fig. 3 is a horizontal section through the improved clamp.

Fig. 4 is a vertical section on line 4—4, of Fig. 2.

Fig. 5 is a perspective view of the inner clamping member.

Fig. 6 is a perspective view of the outer clamping member, and

Fig. 7 is a perspective view of the connector for the clamping members.

Referring more in detail to the drawings, the numeral 1 designates a standard or frame portion of the windshield of a motor vehicle to the opposite sides of which side wings are attached for deflecting the wind away from the occupants to the rear of the shield element. Each wing consists of a transparent panel 2 of plate glass which is mounted for more or less angular adjustment relative to the windshield.

According to the preferred embodiment of the invention, each wing clamp, of which there are usually two employed for mounting each panel or wing, comprises an outer clamping member and an opposed inner clamping member joined by a connector member which not only reinforces the jaws but also constitutes a carrier for the outer jaw.

The outer clamping member or jaw 3 is a substantially L-shaped stamping of channel form with the free edges 4 of its longer side walls constituting the active jaw face and the free edges of the shorter side walls 5 constituting a stop for engaging the adjacent edge of the glass panel to determine the depth to which the same may be inserted in the clamp. The outer end of jaw 3 is finished off into a reinforced nose 6 which closes the end of the channel.

The inner clamping member or jaw 7 is also a stamping, having spaced supporting arms 8 extending therefrom coextensively and substantially parallel to each other. The active face of this jaw is preferably rendered yielding by a strip of rubber 9 which in the present instance is part of an endless band passed over one of the side arms 8 and stretched over the jaws so that its tension will hold the rubber band in position.

The connector body 10 is preferably formed of a metal bar bent substantially into U-shape and herein depicted with one leg slightly longer than its companion leg. The shorter leg 11 is freely received within the channel of the outer clamping member while the longer leg 12 extends into the channel formation of the inner jaw between the supporting arms 8 and engages the under side of the jaw to hold the latter against the clamped wing. The pressure applying or clamping screw 13 is passed through a hole 14 in the outer wall of the jaw 3 and threaded into an opening 15 in the shorter leg of the U-shaped connector 10.

The longer leg 12 lies in flat contact with the inner clamping member and is substantially coextensive therewith so that the active face is considerably reinforced. This reinforcement 12 constitutes an anchor for the outer clamping member having the base of the U-connector extending outwardly about the edge of the wing and the shorter leg overlying the latter for connection with the outer clamping member.

When assembled the foot portion 5 of the outer jaw receives the base of the U-connector and also engages the adjacent end of jaw 7 thereby not only serving as a stop for positioning the latter on the longer leg 12, but providing an uninterrupted jaw facing between the two jaws. The contact between the under side of jaw 7 and the longer leg 12 is cushioned by the interposed under flight of the endless band 9. After the glass wing has been inserted between the jaws to the desired depth, or until limited by its engagement with the stop portion 5, the screw 13 is tightened by threading it further into the opening 15. This operation brings the spaced jaw parts 4 of the outer jaw 3 firmly into contact with the wing, said jaw pivoting about the screw to evenly seat on the glass. As soon as the two jaws are in contact with the opposite faces of the wing, any further tightening of the screw will tend to pull the shorter leg up into the channel of the outer jaw and lift up on the longer leg, resulting in the exertion of opposing pressures on the jaws to clamp more firmly the interposed wing. The connector 10 is substantially entirely concealed within the jaws and is not subjected to contact at an point with the glass wing, but its strength is imparted to the more frail sheet metal jaw formations for firmly clamping the wing panel in position. The two jaws have their channels opening in the same direction and each receives a leg of the connector, the longer leg supporting the inner jaw while the screw 13 secures the shorter leg to the outer jaw.

For attaching the wing clamping device to the side of a windshield, a bracket is provided, herein shown as a stud bolt 16 which is threaded into a socket, provided in the side standard of the windshield, and secured against accidental dislodgment by a jaw nut 17. The head 18 of the bolt is flattened out in the plane thereof and formed with a flared bore or opening 19 for the reception of the smaller end portion of a friction cone or conical washer 20 which may be made of brass. The conical female bearing member 18 of the bracket, with its partially nested conical male bearing member 20, are receivable between the spaced free ends of arms 8 and pivotally secured in position by the connecting bolt 21. The shank of this bolt, adjacent its head, is non-circular in cross section, being herein depicted square, to be received in similarly shaped openings through the friction member 20 and the adjacent arm 8 so that the friction member and said arm are connected to move as a unit. The remote face of the bearing member 18 has flat contact against the companion arm 8, which is also formed with an opening through which the threaded end of the bolt 21 may pass after protruding through the flared opening in the bearing member 18. Both openings 22 in the arms 8 may be of non-circular form whereby the nested bearing members 18 and 20 may be reversed and the connecting bolt entered from the opposite side. A winged nut 23 is engaged on the threaded end of the connecting pivot bolt 21 for being impinged against the adjacent arm 8, thereby drawing the two arms toward each other and forcing the friction member 20 into more intimate contact with the flared wall of the bearing member 18. Slight pressure on the nut 23 provides sufficient friction between the male and female bearing members to securely hold the wing holding jaws at the desired adjustment on the supporting bracket 16. The clamping nut 23 impinges on the adjacent arm which moves as a rigid unit with the companion arm, bolt 21 and friction member 20 so that when the nut is tightened it has no influence acting on it tending to loosen the same. Consequently, the frictional relation established between the male and female bearing members is maintained until the nut is intentionally loosened.

While the improved clamp is herein depicted in connection with a windshield wing for ease of illustration, its use is obviously not limited to such specific use since a mirror or any other glass or translucent panel may equally well be substituted for the transparent wing shown without departing from the spirit of the invention.

The provision of the flat plane surfaced inner jaw 7 and the outer jaw having parallel side lines of contact with the glass panel, together with the substantially floating connector 10 which ensure that the clamping pressure is uniformly distributed between the clamp points of contact, permit of the use of greater clamping pressures and more secure holding of the panel than in ordinary constructions, without injury to the panel, as all pressures are evenly and uniformly applied at all points of contact of the clamping jaws.

I claim as my invention:

1. A windshield wing clamp comprising an outer jaw, an independent and relatively movable inner jaw cooperating with the first jaw to grip the opposite sides of a panel, a connecting part connected to one jaw and extending about the adjacent edge of the panel and having a portion overlying the opposite side of the panel, said other jaw directly engaging said opposite side of the panel and extending outwardly over the outer face of said overlying portion, means for pulling the outward portion of said other jaw down toward the outer face of said overlying portion and said connecting part to thereby directly apply clamping pressure to said other jaw and means for supporting one of the aforesaid elements from a windshield structure.

2. A windshield wing clamp comprising a fixed jaw for engaging one side of a wing, a rigid part extending from said fixed jaw to the opposite side of the wing to overlie said opposite side, a movable jaw straddling said overlying portion and seating directly on said opposite side of the wing, and means engaging said overlying portion and also engaging the relatively superposed portion of said movable jaw for urging said portions together and thereby exerting indirectly a clamping pressure of the movable jaw upon the wing.

3. In a windshield wing clamp, an outer jaw, a cooperating inner jaw, each jaw being of channel formation with the channel of one jaw opening toward the active face of the cooperating jaw, a U-shaped connector having one leg engaged in the channel of the latter jaw beneath its active face to reinforce the same and its other leg received within the channel of the companion jaw, the longitudinal edges of the channel walls of said companion jaw constituting its active jaw face, and means connected to said other leg and acting upon the companion jaw to force the same toward the cooperating jaw.

4. A windshield wing clamp comprising a pair of clamping members cooperable to support an interposed wing, a member having flatly engaging active faces flatly engaged beneath the active face of one clamping member throughout the major portion of the length of said active face to reinforce the same, and pressure applying means coacting with the reinforcing member to exert opposing forces on the two clamping members for gripping an interposed wing.

5. A clamp for panels, comprising a pair of cooperating clamping members, a member underlying the active face of one clamping member, said underlying member extending at one end beyond the end of said active face and thence outwardly and backwardly over the aforesaid active face to overlie the same in spaced relation thereto for permitting a panel being inserted between said active face and the overlying part of said underlying member, and means for exerting a lifting influence on said overlying part to bring the active face against one side of an interposed panel and for exerting a downward force on the cooperating clamping member to bring the latter against the opposite side of said interposed panel.

6. A windshield wing clamp comprising a substantially U-shaped bar, a sheet metal jaw seated on the inner side of one leg of said bar in opposition to the other leg thereof, a second jaw cooperable with the first jaw, and means carried by said other leg for moving said second jaw toward the first jaw.

7. A windshield wing clamp comprising a bar bent to have spaced overlying portions, a clamping member seating on one bar portion, a channeled clamping member straddling the opposite bar portion, and a screw cooperating with the latter portion for exerting pressure on the second clamping member toward the first clamping member.

8. A windshield wing clamp comprising a body having spaced and relatively superposed parts, a clamping member threaded over one part and seated thereon, a channeled clamping member straddling the other part and having a portion extending to overlap an end of the first clamping member and thereby provide a continuous clamping surface between said members, and means for exerting a clamping pressure on the second clamping member.

9. A windshield wing clamp comprising a U-bar, a clamping member seating on and enclosing one leg thereof, a second clamping member enclosing the opposite leg and having a part enclosing the base of the U-bar whereby the latter is substantially concealed within the two clamping members, and means co-acting with the U-bar for rendering the clamping members operative.

10. A windshield wing clamp comprising a substantial body having spaced jaw supporting parts, a sheet metal jaw member having an active jaw face seating on one of said parts and a pair of spaced arms extending therefrom on opposite sides of said part, a second jaw member mounted on the other of said parts for clamping adjustment toward said active face, and a supporting element embraced by said arms and connected thereto for permitting angular adjustment of said jaw members as a unit.

11. A windshield wing clamp comprising a clamping member, a member hooked into engagement with the latter for exerting a lifting force on the same toward one side of a wing, and an opposed clamping member on the opposite side of the wing adjustable on the hooked member toward the first clamping member for effecting a relatively down pressure on said opposite side and thereby exerting an upward pull on said hooked member to cooperate with the first clamping member in clamping the wing therebetween.

12. A clamp comprising a clamping member having parallel arms extending from the active face thereof, a cooperating clamping member, means adjustably supporting the latter for clamping movement toward or away from the active face of the first member and engageable with the latter between the arms to connect the jaws and clamp supporting means embraced by said arms.

13. A wing clamp comprising a pair of cooperating clamping members one of which has a pair of arms extending from the opposite edges of its active face, means adjustably connecting the two clamping members and including a part disposed between the arms of said specified clamping member, a supporting member having a conical female bearing part disposed between the arms, a conical male bearing part movable with one arm and frictionally engaging in the female bearing part, and a pivot bolt adjustably connecting the arms with the interposed bearing parts.

14. In a windshield wing clamp, a jaw body having a jaw face and a pair of rearwardly extending parallel arms formed with alined openings for receiving a pivot bolt, one of said arm openings being non-circular, a bracket for attachment to the frame of a windshield and having a part receivable between the arms of said jaw, said bracket part having a flaring opening therethrough, a conical friction disk extending into the flaring opening of the bracket part and having its larger end projecting therefrom, said friction disk having a non-circular axial opening therethrough, a pivot bolt passing through the openings of the arms, bracket and disk, the headed end of the bolt being non-circular in cross section and fitting the non-circular openings of said arm and said disk, a nut threaded on the opposite end of the bolt for exerting a drawing influence on the bolt to clamp the disk and bracket part between the arms, and a second jaw cooperating with the first jaw to supportingly clamp a wing.

15. In a windshield wing clamp, a jaw having rearwardly extending arms, a second jaw cooperating with the first jaw to clamp a wing, a bracket having a part receivable between the arms, said bracket part having a flared opening, a conical friction member extending into the bracket opening, and a combined pivot and clamping device connecting the arms with the bracket part and friction member therebetween.

16. In a windshield wing clamp, a pair of jaws coopearting to support a wing, one jaw having a pair of spaced arms, a bracket having a part pivotally receivable between the arms, one of said arms and said part having cooperating conical friction bearing surfaces for clamping said part and arms against relative pivotal movement, and means for adjusting the frictional contact between the bearing surfaces.

17. A clamp comprising a rigid substantial body having two relatively superposed jaw supporting legs, a jaw adapted to be mounted on a support and having its active face engaging over the inner surface of one leg, a channeled cooperating jaw telescoped over the other leg toward said active face, and means for adjusting said cooperating jaw on its leg toward the first jaw.

18. A clamp comprising a rigid body having a pair of relatively superposed jaw supporting legs, a jaw adapted to be mounted on a support and having its clamping portion engaging over the inner surface of one leg, an endless cushioning band stretched over the inner and outer surfaces of said clamping portions to cushion the inner surface of the latter on its engaged leg and also provide a cushioned clamping outer surface, and a second jaw cooperating with the first jaw and adjustably engaged with the other leg.

19. The combination of a glass panel, a clamping jaw having parts adapted to engage a portion of one face of said panel and a portion of an edge of said panel, a second clamping jaw having a portion adapted to engage a portion of the opposite face of said panel, said jaws being separable and independent, and a separate detachable connecting and pressure distributing member having portions engaging said opposite jaws, and pressure means applicable at one point on one of said jaws and on said connecting member whereby the pressure effect of said pressure means is distributed uniformly by said connecting and pressure distributing member to all panel engaging portions of said clamping jaws to cause said clamping jaws to grip said panel.

JOHN R. OISHEI.

CERTIFICATE OF CORRECTION.

Patent No. 1,658,390. Granted February 7, 1928, to

JOHN R. OISHEI.

It is hereby certified that error appears in the printed specification of the above numbered patent requiring correction as follows: Page 2, line 61, for the word "an" read "any"; page 3, lines 65 and 66, claim 4, strike out the words "having flatly engaging active faces" and insert the same to follow after the word "members" in line 64, same claim; and that the said Letters Patent should be read with these corrections therein that the same may conform to the record of the case in the Patent Office.

Signed and sealed this 6th day of March, A. D. 1928.

Seal.

M. J. Moore,
Acting Commissioner of Patents.